Sept. 6, 1966        J. A. McDERMOTT        3,271,621

BATTERY OPERATED FLASHER

Filed March 15, 1961        2 Sheets-Sheet 1

INVENTOR
JULIAN A. McDERMOTT

BY *Erwin Salpingbaum*
ATTORNEY

Sept. 6, 1966     J. A. McDERMOTT     3,271,621
BATTERY OPERATED FLASHER

Filed March 15, 1961     2 Sheets-Sheet 2

INVENTOR.
JULIAN A. McDERMOTT

BY
ATTORNEY

United States Patent Office 3,271,621
Patented Sept. 6, 1966

3,271,621
BATTERY OPERATED FLASHER
Julian A. McDermott, 1639 Stephen St., New York, N.Y.
Filed Mar. 15, 1961, Ser. No. 141,925
5 Claims. (Cl. 315—210)

This invention relates broadly to mechanisms whereby lamps may be alternately flashed, and it has more specific reference to a mechanism adapted for use in motor vehicles particularly in connection with directional signals.

At the present time it is the general practice to utilize a flasher mechanism of which the operating element is in series with the lamps. The current through the lamp which it is intended to flash, heats the element, causing the circuit through the lamp to open. When the element cools, the circuit closes, thereby repeating the flashing cycle.

Such an arrangement has many disadvantages. Among them are (1) that the operation and rate of flashing is effected by and in turn limits the number of lamps that can be used. Therefor the present arrangement is particularly undesirable when it includes a switching arrangement to connect different quantities of lamps in the circuit to flash simultaneously; and (2) that a voltage drop exists in the flasher element, which decreases the light output and the efficiency of the lamps.

With this in view, it is the principal object of the present invention to provide a flasher which, when basically connected in series with a lamp will be activated by the flow of current through the lamp.

It is a further purpose of the present invention to provide a flasher which will have a minimum variation in functioning with various quantities of lamps, or with lamps of different capacities connected in the circuit.

It is a further aim of the present invention to achieve these ends without a substantial loss of voltage to the lamps through the flasher.

These and other meritorious aims and advantages are attained by the novel arrangement of few and simple parts, hereinafter described, and illustrated on the accompanying drawings, forming a material component of the present disclosure, and in which.

Figure 1:
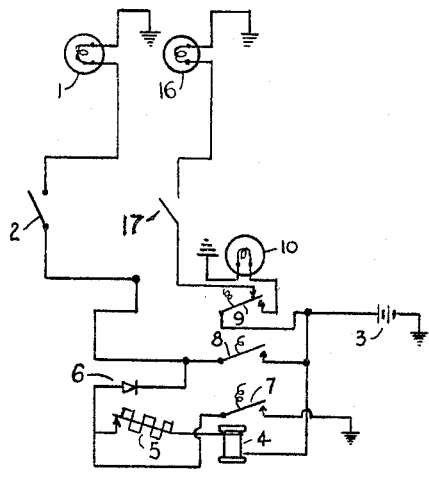
FIGURE 1 is a diagrammatic view of the principal circuit which constitutes the present invention.

Referring in greater detail to the drawing and more particularly to FIGURE 1, the reference numeral 1 refers to a lamp load and the numeral 2 refers to a switch which is illustrated as being disconnected. When switch 2 is closed, a circuit is completed, making it possible for current to flow from the battery 3 through a relay coil 4, thence through a timing element 5, thence through a rectifier 6 and finally through switch 2 to lamp 1. This current energizes the relay coil 4, closing the relay contacts 7 and 8. The closing of contact 7 connects the relay coil 4 directly to ground through the timing element 5.

Simultaneously, the closing of the contact 8 puts the full voltage of battery 3 across lamp 1, thereby obtaining full intensity. The timing element 5 eventually opens the circuit through the relay, deactivating it and causing the contacts 8 and 7 to open. They will remain open until the timing element 5 again closes the circuit. Thus the lamp is flashed without the loss of voltage through the flasher (except contact resistances). It is the purpose of rectifier 6 to prevent a shortcircuiting ground after contact 8 is closed. Relay contacts 7, 8 and 9 are operated simultaneously.

What is here achieved, broadly, is the use of current through a lamp when unlighted, in order to close a relay, to put the full voltage across the lamp, and to continue the activation of the relay and its timing element by transferring one of its connections to ground, at the same time preventing a short circuit by use of a rectifier. Contact 9 provides for the flashing of the additional lamp 10 arm if alternating flashing is desired, lamp 16 may be used when connected to a normally closed contact of the set of contacts 9. Switch 17 controls lamp 16.

Figure 2:
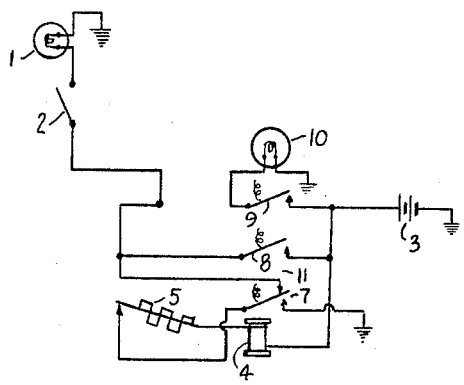
FIGURE 2 is a diagrammatic view of a circuit similar to that illustrated in FIGURE 1, except that the rectifier illustrated in FIGURE 1 is replaced by another contact.

The circuit illustrated in FIGURE 2 is the same as that illustrated in FIGURE 1 except that the circuit illustrated in FIGURE 2 unitizes an additional contact, referred to by the numeral 11, to replace the rectifier function described in connection with FIGURE 1.

Figure 3:
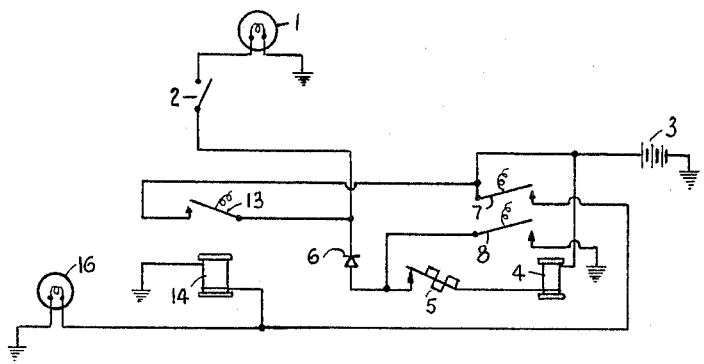
FIGURE 3 is a diagrammatic view of a circuit similar to that shown in FIGURE 1 except that multiple relays are used.

The circuit illustrated in FIGURE 3 is generally similar to that illustrated in FIGURE 1 except that in the circuit illustrated in FIGURE 3 multiple relays are used. Less sensitive relays and lower operating voltages can be used if desired. In the circuit here illustrated, when switch is closed, a current flows through the relay 4 and the timing element 5 as well as through the rectifier 6. The subsequent closing of the circuit through armature 7 energizes the relay 4 and a second lamp. Closing of the contact 8 maintains the current through relay 4 and timing element 5 even when contacts 13 are closed. The closing of the contacts 13 puts the full voltage across the lamp 1. However, when the timing element 5 opens the circuit through the relay 4, and contacts 7 and 8 open, relay 14 becomes deactivated, so that the opening of the lamp circuit 13 results. The re-closing of the circuit through timing element 5 starts the repetition of the flashing cycle.

Figure 4:
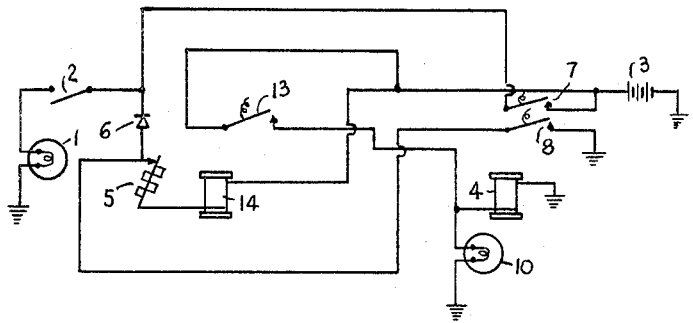
FIGURE 4 illustrates a circuit which is generally similar to that illustrated in FIGURE 1 except that in FIGURE 4 a different method of switching is illustrated.

FIGURE 4 illustrates a generally similar circuit, but a different method of switching is used. In this circuit the closing of the switch 2 completes the circuit from the battery 3 through the relay 14, the timing element 5, the rectifier 6 and the lamp 1. The resultant closing of the contact at 13 actuates relay 4 and lamp 10. The main lamp 1 is then brought to full intensity by the closing of the contact 7. Voltage is maintained across relay 14 by contact 8.

The opening of the relay circuit 14 by the action of the timing element 5 reactivates the relays whereby the lamps are again illuminated, whereby flashing results.

Figure 5:
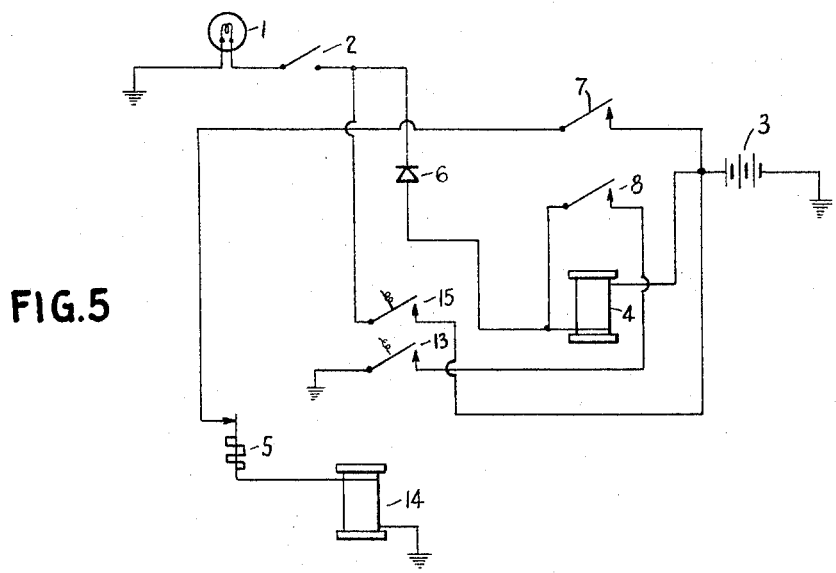
FIGURE 5 illustrates a circuit which is generally similar to the circuit illustrated in FIGURE 4.

The functioning of the circuit shown in FIGURE 5 is generally similar to that shown in FIGURE 4. However two relays are here used, so that the sensitivity of each can be less than that of a single relay as was shown in FIGURE 1.

In the circuit illustrated in FIGURE 5, when the switch 2 is closed, current flows from the battery 3 through the relay coil 4, the rectifier 6 and the lamp 1. Energizing the relay coil 4 results in the closing of the contacts 7 and 8. Closing of contact 7 energizes relay coil 14 through timing element 5. Closing of contact 8 results in the completion of a circuit from the battery 3 through relay coil 4 and contacts 13 to ground. This is necessary because with the closing of contacts 15, the lamp 1 is connected directly to the battery, thereby eliminating a voltage drop across relay coil 4. When the timing element 5 opens the circuit through relay coil 14 and subsequently cycles, contact 15 opens and closes resulting in the flashing of the lamp 1.

Rectifier 6 prevents a short circuit when contacts 15 close.

Whenever timing elements are illustrated or described, such disclosure is to be regarded as generic and not as specific to the exact elements defined. Timing elements which can be used effectively may be bimetallic strips heated by the current, a switch which is opened by the heating of a wire by the current, a switch operated by electronic means, a transistor or any other suitable and desirable element. The arrangement shown in FIGURE 2, where an extra contact serves the purpose accomplished by the rectifier illustrated in FIGURE 1, may be applied to the other circuits illustrated in the drawings, if so desired.

A contact or contacts may be added to the relay or relays shown on any of the diagrams whenever it is desired to flash additional lamps. It is to be noted that, while the several relays hereabove illustrated and described are of the magnetic type, thermal relays or other kinds of current controlling means can be substituted with equal effectiveness.

It is to be understood that the foregoing is to be regarded as descriptive and illustrative of the best known forms of the present invention and not as limitative or restrictive to the exact details shown, applicant reserving the right to make such changes in his circuits as might come within the scope of the appended claims without thereby departing either from the spirit or the scope of the present invention.

Having thus described the invention, what is claimed as new and desired to secure by Letters Patent, is:

1. In a device to flash incandescent lamps, a relay having a coil, said coil connected in series with a lamp, a current actuated intermittent current interrupting timing element, said timing element connected in series with said coil, a source of direct current, the several elements hereabove referred to connected to said power source, first contact means controlled by said relay which when actuated connect said lamp directly to said power source by passing said relay coil and said element, second contact means actuated by said relay coil for simultaneously connecting said relay coil and said element in parallel with said lamp, and third contact means actuated by said relay coil whereby said lamp is removed from said series circuit.

2. In a device to flash incandescent lamps, a relay having a coil, said coil connected in series with a lamp, a current actuated intermittent current interrupting timing element connected in series with said relay coil, a source of direct current, the several elements hereabove referred to connected to said power source, first contact means controlled by said relay which when actuated connect said lamp directly to said power source by passing said relay coil and said element, and second contact means actuated by said relay coil for simultaneously connecting said relay coil and timing element in parallel with said lamp.

3. In a device to flash lamps including an actuating power source, actuating circuitry connected in series between the power source and a lamp, said circuitry being responsive to current through said lamp, said circuitry including current responsive contact means to connect the circuitry in parallel with said lamp when current flows, second contact means to then connect said lamp directly to the power source, means to remove said lamp from said series circuit when the paralleling contact is made, and said circuitry including current controlling means within said circuitry to intermittently deactivate said contact means.

4. In a device to flash incandescent lamps a relay having a coil, said coil connected in series with a lamp, a current activated intermittent current interrupting timing element connected in series with said relay coil, a rectifier connected in series with said relay coil and said timing element, the whole being connected to a source of direct current electrical power, first contact means controlled by said relay whereby when actuated said lamp is directly connected to said source of power whereby by-passing said relay coil and said timing element, second contact means actuated by said relay coil whereby to simultaneously connect said relay coil and said timing element in parallel with said lamps, and said rectifier being so positioned as to remove said lamp from said series circuit.

5. In a device to flash lamps including an actuating power source, actuating circuitry and devices connected in series between said power source and a lamp, said circuitry and devices being current responsive to close a circuit providing current directly to said lamp, said circuitry and devices also being responsive to simultaneously connect said circuitry and devices in parallel with said lamp and said circuitry and devices including a current actuated intermittent current interupting means.

References Cited by the Examiner

UNITED STATES PATENTS

| | | | |
|---|---|---|---|
| 2,321,803 | 6/1943 | Falge et al. | 340—83 |
| 2,876,432 | 3/1959 | Gordon | 340—81 |

DAVID J. GALVIN, *Primary Examiner.*

GEORGE N. WESTBY, ARTHUR GAUSS, *Examiners.*

V. LAFRANCHI, S. A. SCHNEEBERGER,
*Assistant Examiners.*